(12) United States Patent
De Luz (10) Patent No.: US 9,434,240 B1
(45) Date of Patent: Sep. 6, 2016

(54) ULTRAVIOLET RADIATION RESPONSIVE SUN VISOR

(71) Applicant: Veronica P. De Luz, Dewinton (CA)

(72) Inventor: Veronica P. De Luz, Dewinton (CA)

( * ) Notice: Subject to any disclaimer, the term of this patent is extended or adjusted under 35 U.S.C. 154(b) by 0 days.

(21) Appl. No.: 14/620,569

(22) Filed: Feb. 12, 2015

Related U.S. Application Data (60) Provisional application No. 61/940,624, filed on Feb. 17, 2014.

(51) Int. Cl.
| | |
|---|---|
| *B60J 3/02* | (2006.01) |
| *G02B 5/20* | (2006.01) |
| *G02B 5/23* | (2006.01) |
| *G02B 1/11* | (2015.01) |

(52) U.S. Cl.
CPC ............ *B60J 3/0239* (2013.01); *B60J 3/0208* (2013.01); *B60J 3/0252* (2013.01); *G02B 1/11* (2013.01); *G02B 5/208* (2013.01); *G02B 5/23* (2013.01)

(58) Field of Classification Search
CPC .... B60J 3/0239; B60J 3/0208; B60J 3/0252; G02B 5/208; G02B 1/11; G02B 5/23
USPC ...................................... 296/97.2, 97.8, 97.9
See application file for complete search history.

(56) References Cited

U.S. PATENT DOCUMENTS

| | | | |
|---|---|---|---|
| 5,842,748 A * | 12/1998 | Cummins | .............. B60J 3/0208 296/97.2 |
| 6,131,987 A | 10/2000 | Rossiter | |
| 6,189,947 B1 | 2/2001 | Annan | |
| 6,899,371 B1 | 5/2005 | Hammond | |
| 7,344,176 B2 | 3/2008 | Maharaj | |
| 7,722,109 B1 | 5/2010 | McGehee | |
| 7,802,836 B2 * | 9/2010 | Baudouin | .............. B60J 3/0204 296/97.1 |
| 8,083,385 B1 | 12/2011 | Yang | |
| 8,102,586 B2 | 1/2012 | Albahari | |
| 8,215,696 B2 | 7/2012 | Akiya | |
| 2003/0214147 A1 | 11/2003 | Mashburn | |
| 2009/0134656 A1 * | 5/2009 | Mori | ...................... B60J 7/0015 296/97.4 |
| 2013/0161972 A1 * | 6/2013 | Marcus | .................. B60J 3/0239 296/97.11 |
| 2015/0210145 A1 * | 7/2015 | Blankson | ............... B60J 3/0278 296/97.8 |

* cited by examiner

*Primary Examiner* — Pinel Romain
(74) *Attorney, Agent, or Firm* — Robert C. Montgomery; Montgomery Patent & Design, LLC

(57) ABSTRACT

A vehicle UV sun visor that includes a support frame that is configured to be attached to an interior surface of a roof of a vehicle as well as a first support rod and a second support rod, each of which is pivotally affixed to the support frame. Also included is a double visor assembly having a first panel assembly and a receiver panel assembly that are pivotally attached to the support frame. The support frame has a headliner face along an upper planar surface and a mounting face along a lower planar surface. The headliner face is configured to be affixed to the interior surface of a vehicle roof. A first support pivot pivotally affixes the first support rod to the support frame. A second support pivot pivotally affixes the second support rod to the support frame. Beneficially the support rods are "L" shaped.

16 Claims, 11 Drawing Sheets

ULTRAVIOLET RADIATION RESPONSIVE SUN VISOR

RELATED APPLICATIONS

This application claims the benefit of U.S. Provisional Application No. 61/940,624, filed on Feb. 17, 2014.

FIELD OF THE INVENTION

The present invention relates generally to sun visors. More particularly, the present invention relates to adjustable, large area sun visors that shade from direct sunlight with reduced glare.

BACKGROUND OF THE INVENTION

Virtually every automobile is equipped with some sort of sun visor that can be used to shield a driver's eyes from bright skies and sunlight. Prior art sun visors are typically folded down from the interior roof of a vehicle on a hinged arm and pivoted as required to block the offending incoming light. When not in use prior art sun visors are pivoted back into position and folded up into their storage space.

While highly successful prior art sun visors are essential all-or-nothing devices. Once light is blocked from a particular direction then vision in that direction is also blocked. Thus other vehicles, traffic control devices, pedestrians, street signs, and the like might be visually blocked by a sun visor. Obviously this creates a safety concern not only for the vehicle occupants but also for those who share the streets.

Another problem with prior art sun visors is that they are essentially "fixed" in size and are arranged in a "flat" plane. While that plane could be tilted and pivoted the coverage remained that of a fixed size flat plane.

Accordingly, there exists a need for an improved vehicle sun visor that can block excess sunlight and glare while providing better vision and safety than prior art sun visors. In addition, highly adjustable vehicle sun visors that protect along multiple planes would be useful. Preferably such sun visors could be used in cars and trucks and in other vehicles which require safe operation in glaring sunlight such as aircraft, trains, and marine craft.

SUMMARY OF THE INVENTION

The present invention provides for an improved vehicle sun visor that can block sunlight and glare while providing improved vision and safety over prior art sun visors. The improved vehicle sun visor is highly adjustable and can be configured to work in multiple planes. Improved sun visors in accord with the present invention are useable in cars and trucks as well as in other vehicles such as aircraft, trains, and marine craft.

A vehicle ultraviolet (UV) sun visor in accord with the present invention includes a support frame that is configured to be attached to an interior surface of a roof of a vehicle, a first support rod and a second support rod, each of which is pivotally affixed to the support frame, and a double visor assembly having a first panel assembly and a receiver panel assembly that is pivotally attached to the support frame.

In practice the support frame has a quadrilateral cross-section. In addition, the support frame can have a headliner face along an upper planar surface and a mounting face along a lower planar surface. The headliner face is configured to be affixed to the interior surface of a vehicle roof. The UV sun visor may further include a first support pivot for pivotally affixing the first support rod to the support frame. In addition, it can also include a second support pivot for pivotally affixing the second support rod to the support frame. Beneficially the first support rod is "L" shaped and the short leg is retained by a first support pivot.

The first panel assembly preferably has a first planar member and a second planar member that are made from a flexible polymer having a low glass transition temperature and are treated with an anti-reflective material. To that end the first planar member includes suspended photo-chromic particles. Beneficially, the second planar member is slidably attached to the first planar member. The first planar member may include a slidably attached third planar member opposite the second planar member. The first planar member may also include a clearance cutout while the third planar member may include a slide guide that is attached to a slide rail of the first planar member. The slide guide may have a rail stop.

The receiver panel assembly preferably has a receiver panel and an insert panel. The insert panel is then slidably deployable from a stored position within the receiver panel. The receiver panel may also include a clearance cutout. A UV sun visor may also include a pivot clip configured to retain the second support rod on the support frame.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIG. 4 presents an isolated view of a panel slide 52 of the first panel assembly 30 shown in FIG. 2a;

DESCRIPTIVE KEY

10 UV sun visor
16 anti-reflective surface
20 double visor assembly
22 support frame
24 headliner face
26 mounting face
30 first panel assembly
32 first panel
34 support cutout
36 first support rod
38 first support pivot
42 first rod hinge
44 slot
46 cylinder
48 keeper
50 second panel
52 panel slide
54 slide rail
56 slide guide
58 rail stop
59 guide stop
60 third panel
70 receiver panel assembly
72 clip cutout
74 second support rod
76 second support pivot
78 second rod hinge
80 receiver panel
84 slide aperture
86 detent
88 pivot clip
90 insert panel
92 slide pin
94 panel tab
96 grip

DETAILED DESCRIPTION OF THE PREFERRED EMBODIMENT

The preferred embodiment of the present invention is depicted within FIGS. 1 through 11. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one (1) of the referenced items. In addition, unless otherwise denoted all directional signals such as up, down, left, right, inside, outside are taken relative to the illustration shown in FIG. 1.

The terms "a" and "an" as used herein do not denote a limitation of quantity, but rather denote the presence of at least one of the referenced items. In addition, unless otherwise denoted directional signals such as up, down, left, right, inside, outside are taken relative to the illustration in FIG. 1

The present invention describes an ultraviolet responsive UV sun visor 10 which protects the operator and the front-seat passenger of a vehicle from direct sunlight while not completely blocking the field of vision. The UV sun visor 10 has a plurality of rotating and/or sliding sections which can be selectively and adjustably deployed to increase the protected area. The UV sun visor 10 is also provided with an anti-reflective surface which reduces glare under all light conditions. While the preferred embodiment of the UV sun visor 10 is a retrofit device for an existing vehicle, it also can be easily incorporated into the design of any vehicle.

There exists in most vehicles a paired combination of all of the components (left and right), therefore, for the sake of clarity and simplicity, only the components on the operator's side of the passenger cabin will be enumerated and discussed with the understanding that those mirrored, or in some cases identical, components may exist on the opposite side of the vehicle and function in the same manner.

Figure 1:
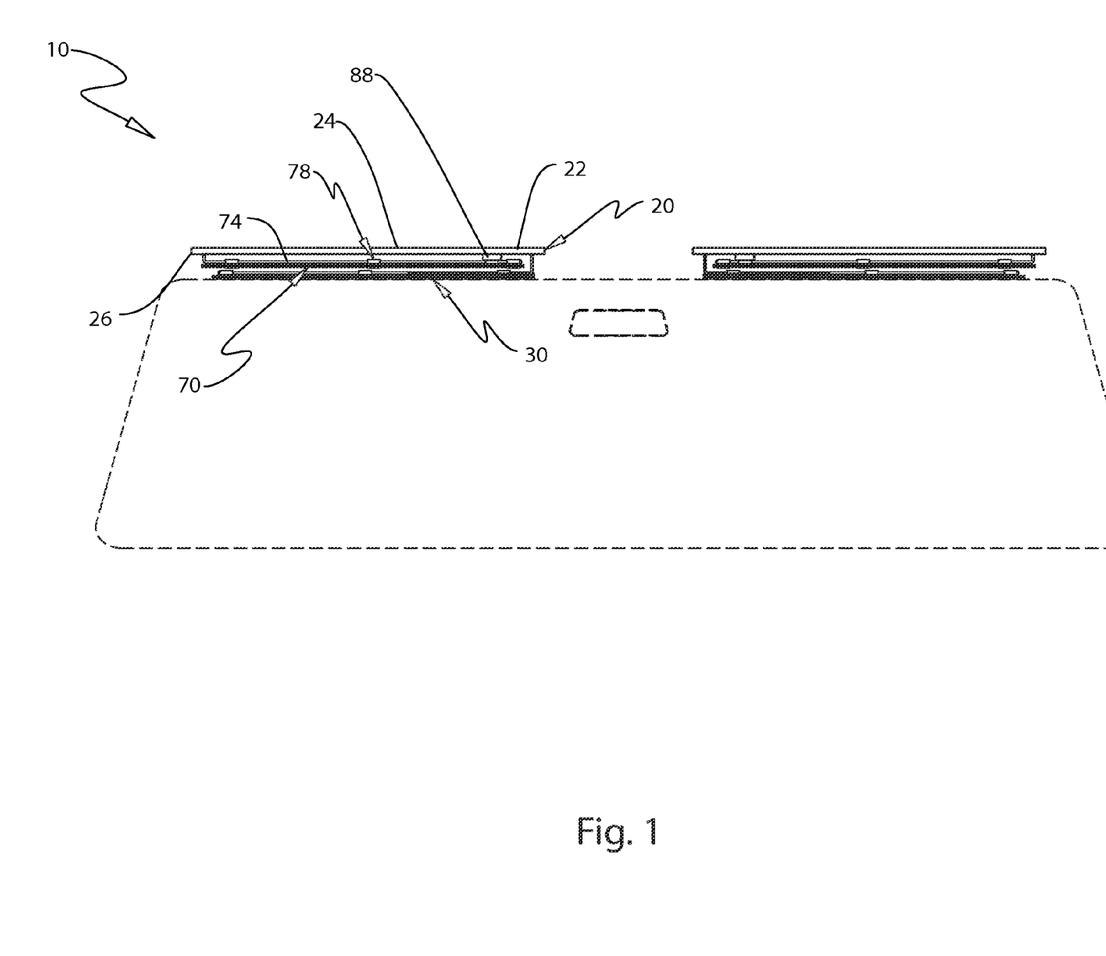
FIG. 1 is an environmental view of a UV sun visor 10 that is in accord with the principles of the present invention and which is in a collapsed and stored configuration.

Refer now to FIG. 1 for a view of the UV sun visor 10 in a collapsed and stored configuration according to the preferred embodiment of the present invention. The UV sun visor 10 includes a double visor assembly 20 configured to be a first panel assembly 30 and a receiver panel assembly 70 pivotally attached to a support frame 22. The support frame 22 may be of any suitable material such as a machined thermoplastic bar or some type of metal having a plating material to resist corrosion or deterioration. The support frame 22 is generally a polyhedron having a quadrilateral cross-section with a headliner face 24 along an upper planar surface and a mounting face 26 along a lower planar surface. The headliner face 24 and the mounting face 26 need not be parallel. The headliner face 24 is intended to be affixed to the interior surface of a roof or a headliner panel by an appropriate fastener.

Figures 2A, 2B:
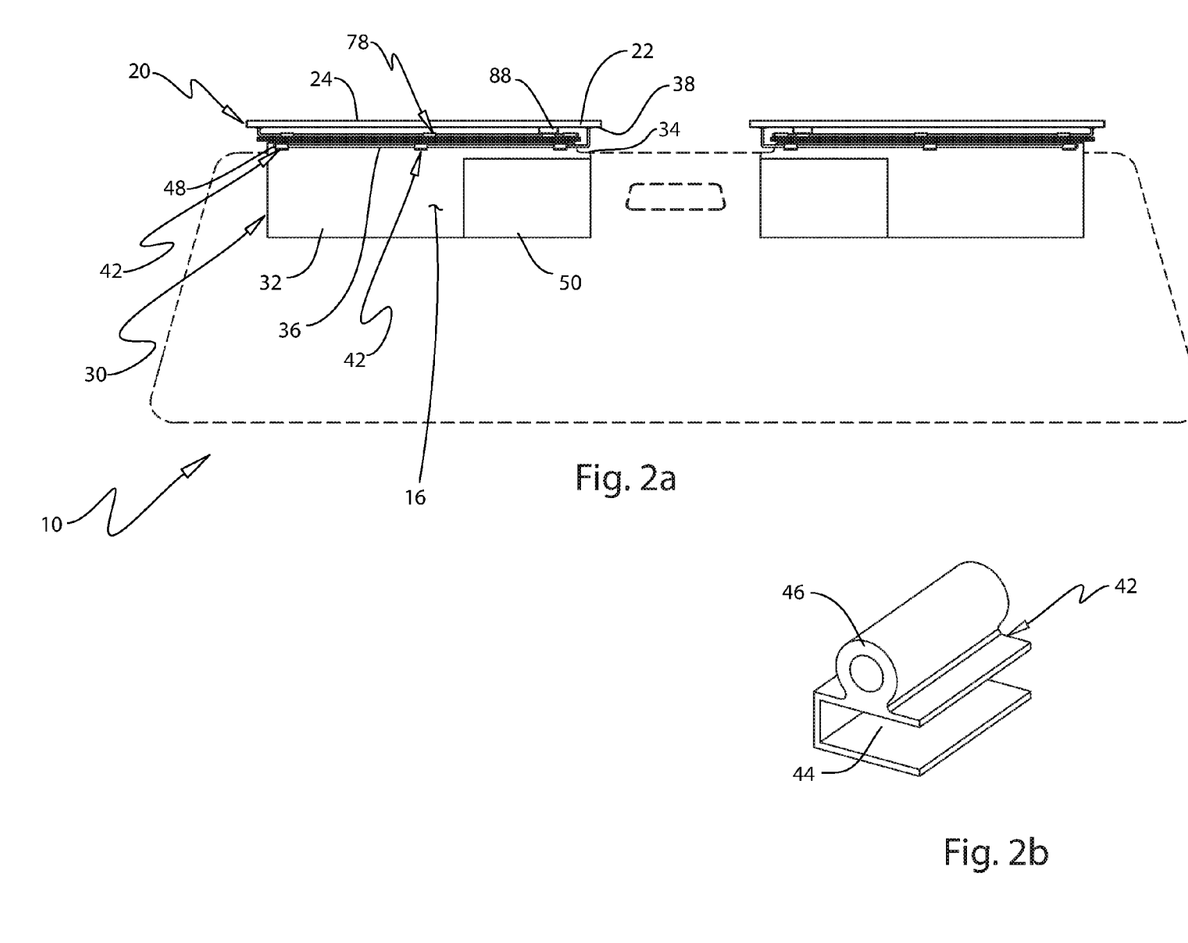
FIG. 2a is an environmental view of the UV sun visor 10 shown in FIG. 1 when partially deployed.
FIG. 2b is a perspective view of a first rod hinge 42 used in the UV sun visor 10 shown in FIGS. 1 and 2.
Figure 6:
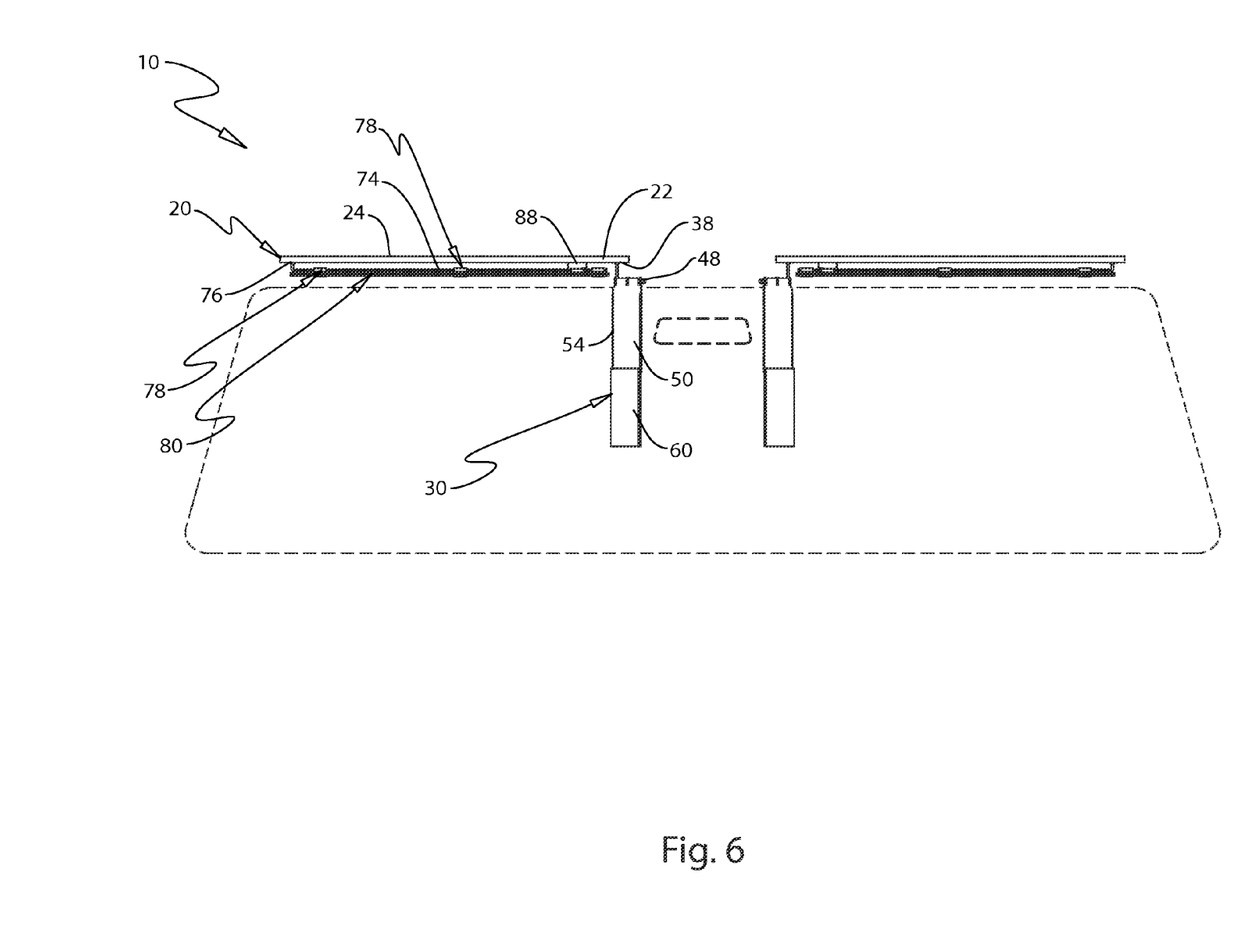
FIG. 6 depicts the first panel assembly 30 of FIGS. 2a and 5 rotated toward mid-cabin and with a third panel 60 extended.

Referring now also to FIG. 2a, attached to the mounting face 26 of the support frame 22 by an appropriate fastener is a first support rod 36 having a first support pivot 38 and a second support rod 74 having a second support pivot 76 (see FIG. 6). The first support rod 36 and the second support rod 74 are preferably "L"-shaped cylindrical rods having one (1) leg significantly shorter than the other. The support rods 36, 74 are made of a plated metal to resist corrosion. It is understood that other materials, such as a rigid thermoplastic or a composite material, may be utilized in the fabrication of the support rods 36, 74 without limiting the scope of the UV sun visor 10.

The first support pivot 38 provides a means to retain the first support rod 36 by the shorter leg to the support frame 22 while also permitting the longer leg to be rotated about the retained shorter leg. The first support pivot 38 may include an escutcheon plate to cover or protect certain features of the mechanism. The second support pivot 76 provides a similar function the second support rod 74.

Referring now to FIG. 2a, the first panel assembly 30 is an array of preferably rectangular, planar pieces of a flexible polymer having a low glass transition temperature (for example, siloxanes or polybutylacrylate) in which organic photo-chromic particles, such as oxazines or naphthopyrans, have been suspended to a depth of at least one hundred fifty micrometers (150 µm). The first panel assembly has an anti-reflective surface 16. It should be understood that other materials and processes that have similar properties may be utilized in the manufacture of the first panel assembly 30 without limiting the scope of the UV sun visor 10.

Still referring to FIG. 2a, the first panel assembly 30 includes a first panel 32, a second panel 50, and a third panel 60 (see FIG. 4) which are treated with an anti-reflective material to reduce glare. Any, or all, of the panels 32, 50 and 60 may be provided with additional peripheral framework to increase the structural rigidity in order to support any other attached portion of the first panel assembly 30. The first panel 32 is attached to the first support rod 36 by means of a plurality of first rod hinges 42 that are evenly spaced along a long edge.

Referring now to FIGS. 2a and 2b, the first rod hinges 42 are preferably configured as a plate having a slot 44 to capture and retain the edge of the first panel 32. The first rod hinges 42 are also provided with a cylinder 46 into which the first support rod 36 is appropriately inserted. The slot 44 may be sized to retain the first panel 32 by an interference fit, or alternately by means of a retaining pin such as a rivet or set screw. The first rod hinges 42, and by associative inclusion the first panel 32, are retained on the first support rod 36 by means of a keeper 48 which is attached to the end of the first support rod 36. The keeper 48 is preferably an interference type end cap, however, other devices, such as a snap ring, may be utilized with equal efficacy.

The first panel 32 is provided with a support cutout 34 to allow any necessary clearance for the first support rod 36 as the first panel assembly 30 is adjusted to suit a user's needs. The size and shape of the support cutout 34 may vary according to the vehicle into which the UV sun visor 10 is installed.

Figure 3:
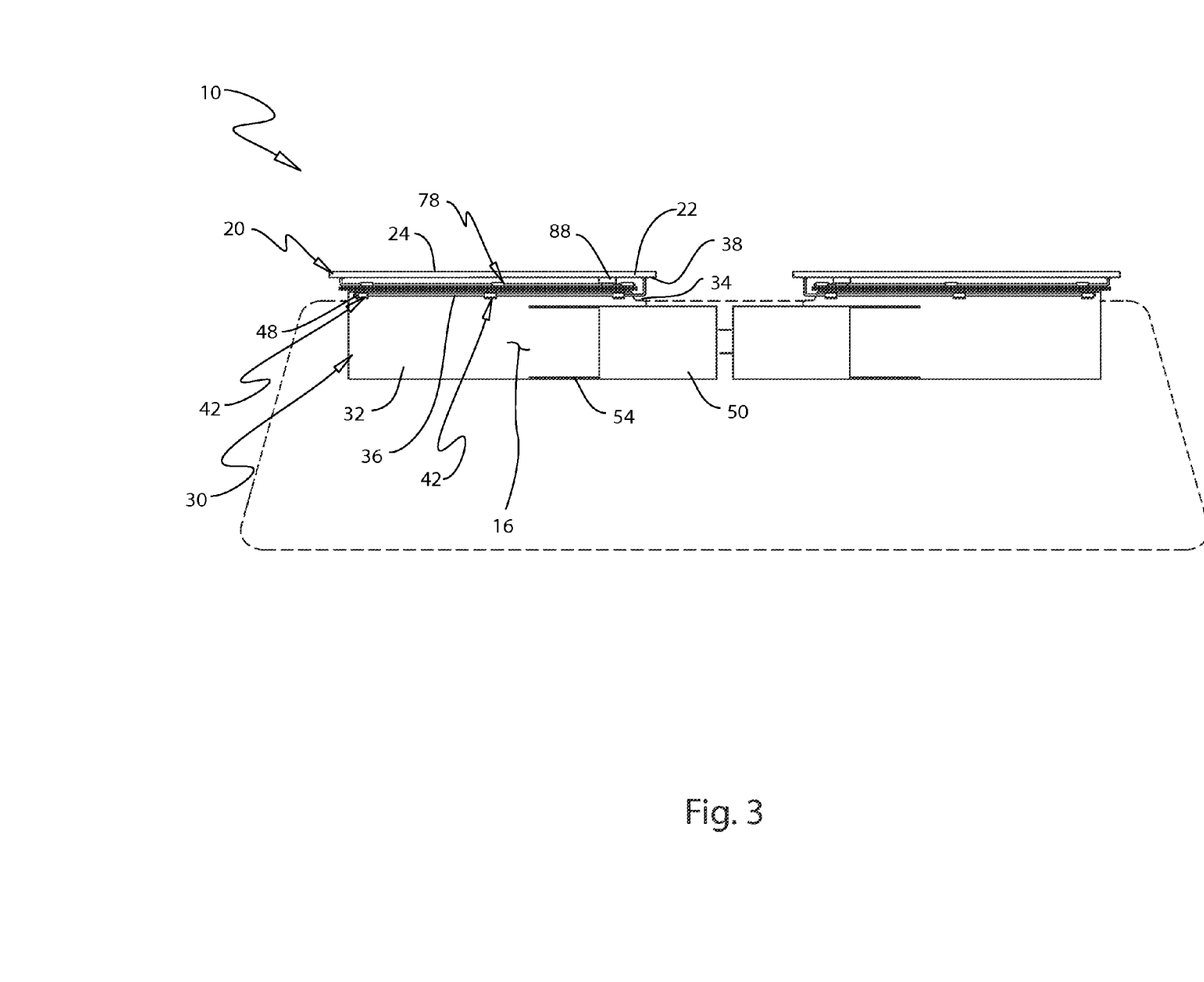
FIG. 3 illustrates deployment of a first panel 32 and a second panel 50 of the UV sun visor 10 of FIGS. 1 and 2 deployed across a windshield.

Refer now to FIG. 3 for a view of the UV sun visor 10 depicting deployment of a first panel 32 and a second panel 50. The second panel 50 is attached to the end of the first panel 32 closest to the first support pivot 38 and preferably on the face of the first panel 32 which is turned toward a user in the configuration depicted in FIG. 3. The second panel 50 is slightly smaller in width than the first panel 32 to enable the second panel 50 to be attached to that portion of the first panel 32 in which the support cutout 34 is disposed. The length of the second panel 50 is sufficient to provide some shielding from light entering the the windshield near a rearview mirror.

Figure 4:
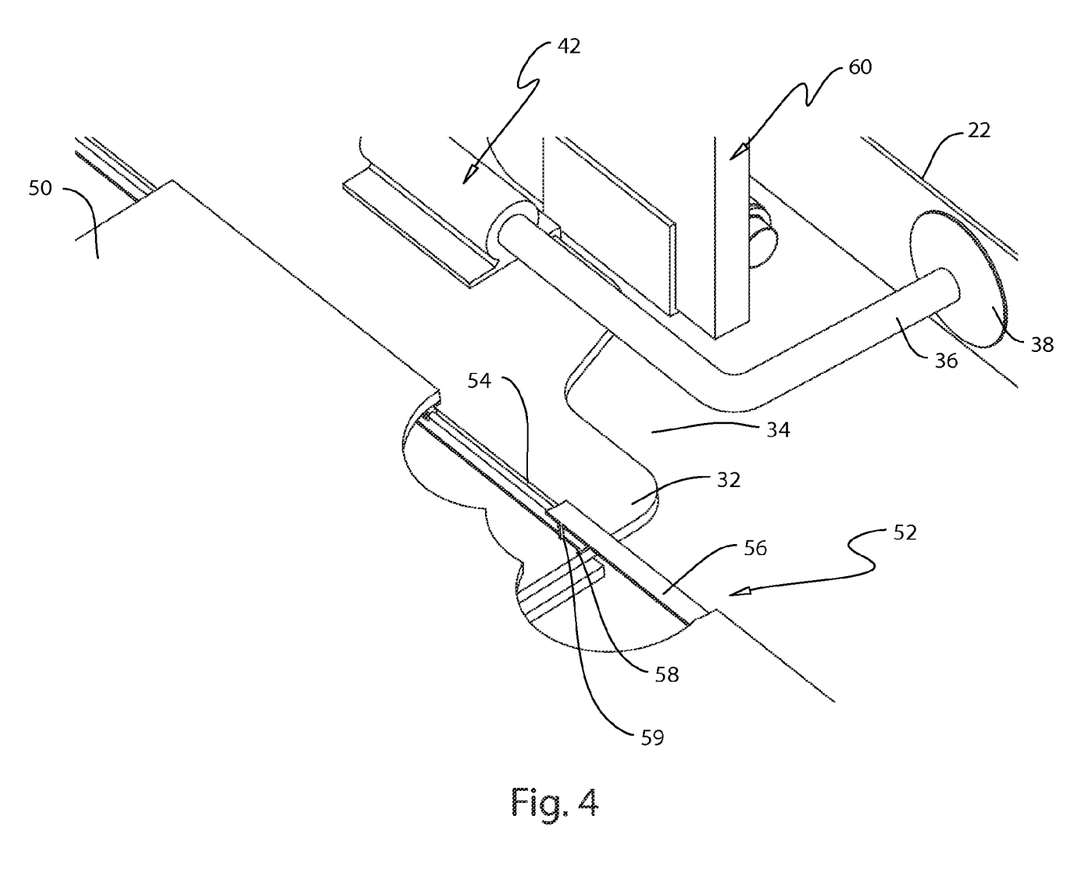

Referring now also to FIG. 4, the second panel 50 is supported on a pair of panel slides 52 which allow for selective positioning of the second panel 50 relative to the first panel 32. The panel slides 52 are as an interconnected combination of a slide rail 54 and a slide guide 56. The slide rail 54 is preferably a cylindrical rod formed with or attached to a rectangular bar by means of an intervening flange. The slide guide 56 is preferably a generally "C"-shaped extrusion formed with or attached to another rectangular bar along a projecting flange. The cylindrical rod of the slide rail 54 engages into the "C"-shaped extrusion of the slide guide 56 to constrain the panel slide 52 in two (2) axes while allowing relative sliding motion as required to selectively position the second panel 50.

The slide guides 56 are preferably attached to the opposite side edges of the second panel 50 by an appropriate fastener such as bonding with some adhesive. The slide guide 56 is provided with a projecting guide stop 59 which eventually contacts a corresponding rail stop 58 projecting from the slide rail to limit the travel of the second panel 50. The slide rails 54 are preferably attached to the first panel 32 in any suitable way such as, but not limited to bonding with some adhesive. It can be understood that other embodiments of similar panel slides 52 can be incorporated into the UV sun visor 10 without limiting the scope of the invention.

Figure 5:
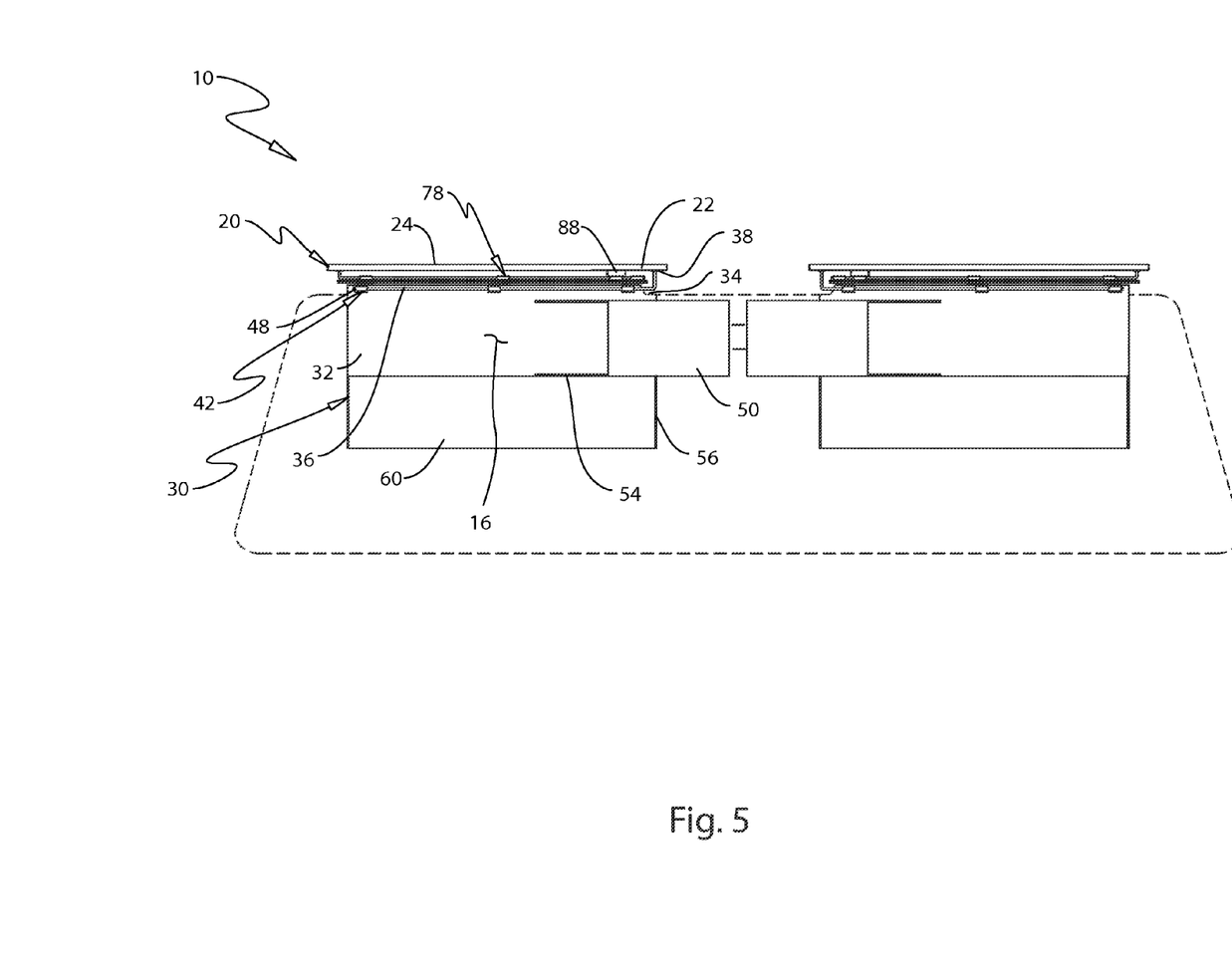
FIG. 5 shows the first panel assembly 30 fully deployed across a windshield.

Refer now to FIG. 5 for a view of the UV sun visor 10 depicting the first panel assembly 30 completely deployed. The third panel 60 is approximately the same length as the first panel 32; however, the width of the third panel 60 is less than the width of the first panel 32. This enables proper collapse into the stowed configuration. A slide guide 56 is attached at each side edge of the third panel 60. A slide rail 54 is attached to each side edge of the first panel 32 on the face of the first panel 32 opposite from the attachment of the second panel 50. A sufficient amount of friction exists in the fit between the slide rails 54 and the slide guides 56 to retain the third panel 60 in any spatial relationship with the first panel 32 along the length of the panel slide 52. The panel slides 52 on the third panel 60 are provided with the same rail stops 58 and guide stops 59 as previously discussed on the panel slides 52 on the second panel 50.

Refer now to FIG. 6 for a view of the UV sun visor 10 depicting the first panel assembly 30 rotated toward mid-cabin. The first support pivot 38 allows the first support rod 36 to rotate such that the first panel assembly 30 can shield a user from intense light coming from beyond mid-cabin. The second panel 50 may be somewhat restricted in the amount of extension from the first panel 32 while the first panel assembly 30 is in this configuration.

Figures 7A, 7B:
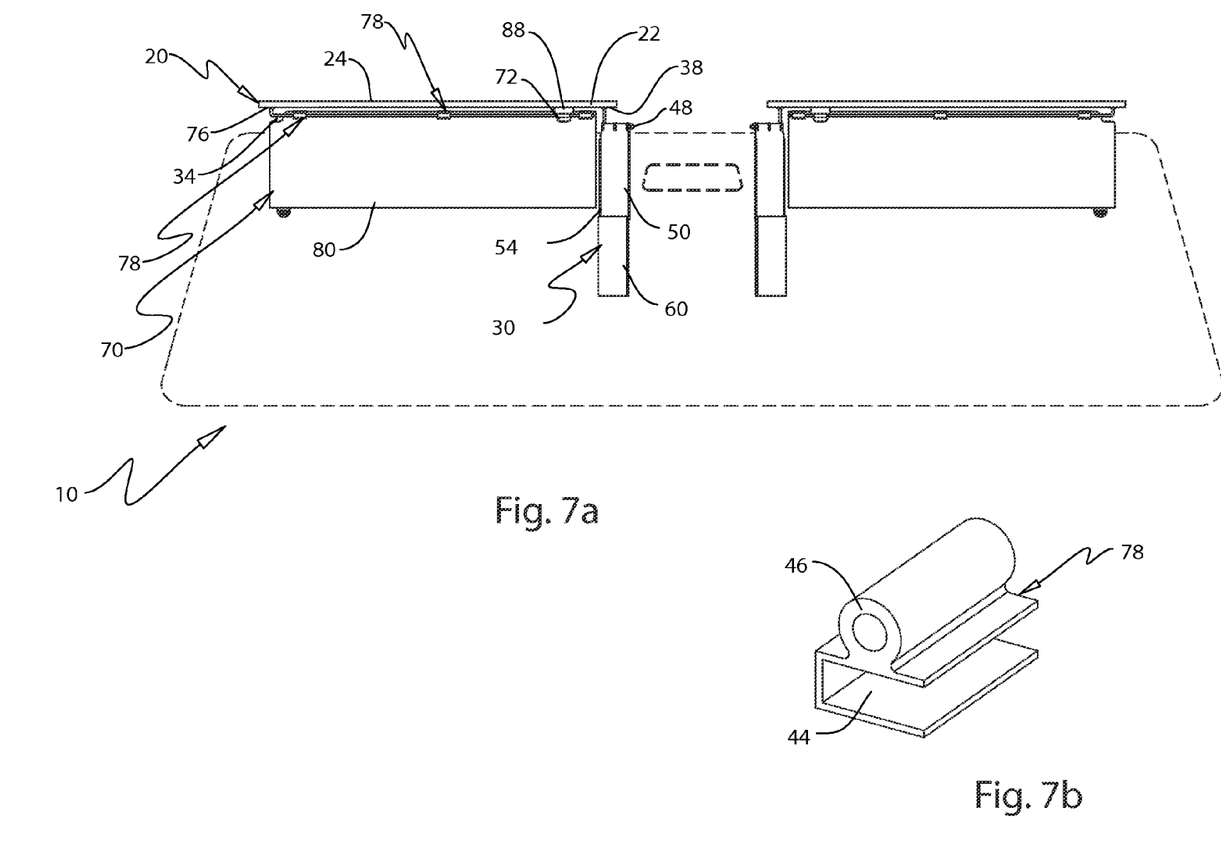
FIG. 7a shows a receiver panel assembly 70 of the UV sun visor 10 shown in FIGS. 1 and 2 deployed across the windshield, the first panel assembly 30 of FIGS. 2a and 5 rotated toward mid-cabin, and with the third panel 60 of FIG. 6 extended.
FIG. 7b is a perspective view of a second rod hinge 78 of the UV sun visor 10 shown in FIGS. 1 and 2.

Refer now to FIG. 7a for a view of the UV sun visor 10 depicting a receiver panel assembly 70 deployed across the windshield and a first panel assembly 30 rotated toward mid-cabin. The receiver panel assembly 70 is preferably configured to be substantially the same material as is used in the first panel assembly 30. The receiver panel assembly 70 includes a receiver panel 80 and an insert panel 90 (see FIG. 8a) which are also treated with an anti-reflective material to reduce glare.

The receiver panel 80 is attached to the second support rod 74 (see FIG. 6) by a plurality of second rod hinges 78 that are evenly spaced along a long edge. The second rod hinges 78, seen in FIG. 7b, are preferably configured as a plate having a slot 44 to capture and retain the edge of the receiver panel 80. The second rod hinges 78 are also are provided with a cylinder 46 into which the second support rod 74 are inserted. The slot 44 may be sized to retain the receiver panel 80 by an interference fit, or alternately by means of a retaining pin such as a rivet. The second rod hinges 78 and by associative inclusion the receiver panel 80 (see FIG. 8a) are retained on the second support rod 74 by means of a keeper 48 that is attached to the end of the second support rod 74. The receiver panel 80 is provided with a support cutout 34 (FIG. 5), much the same as the first panel 32, to allow any necessary clearance for the second support rod 74 as the receiver panel assembly 70 is adjusted to suit a user's needs. The size and shape of the support cutout 34 may vary according to the vehicle into which the UV sun visor 10 is installed.

Still referring to FIG. 7a, the support frame 22 is provided with a secondary support mechanism, namely a pivot clip 88, for the suspension of the second support rod 74 in a stowed position as well as any partially or fully deployed configuration in front of a user. The receiver panel 80 is also provided with a clip cutout 72 to permit a clearance for the pivot clip 88.

Figures 8A, 8B:
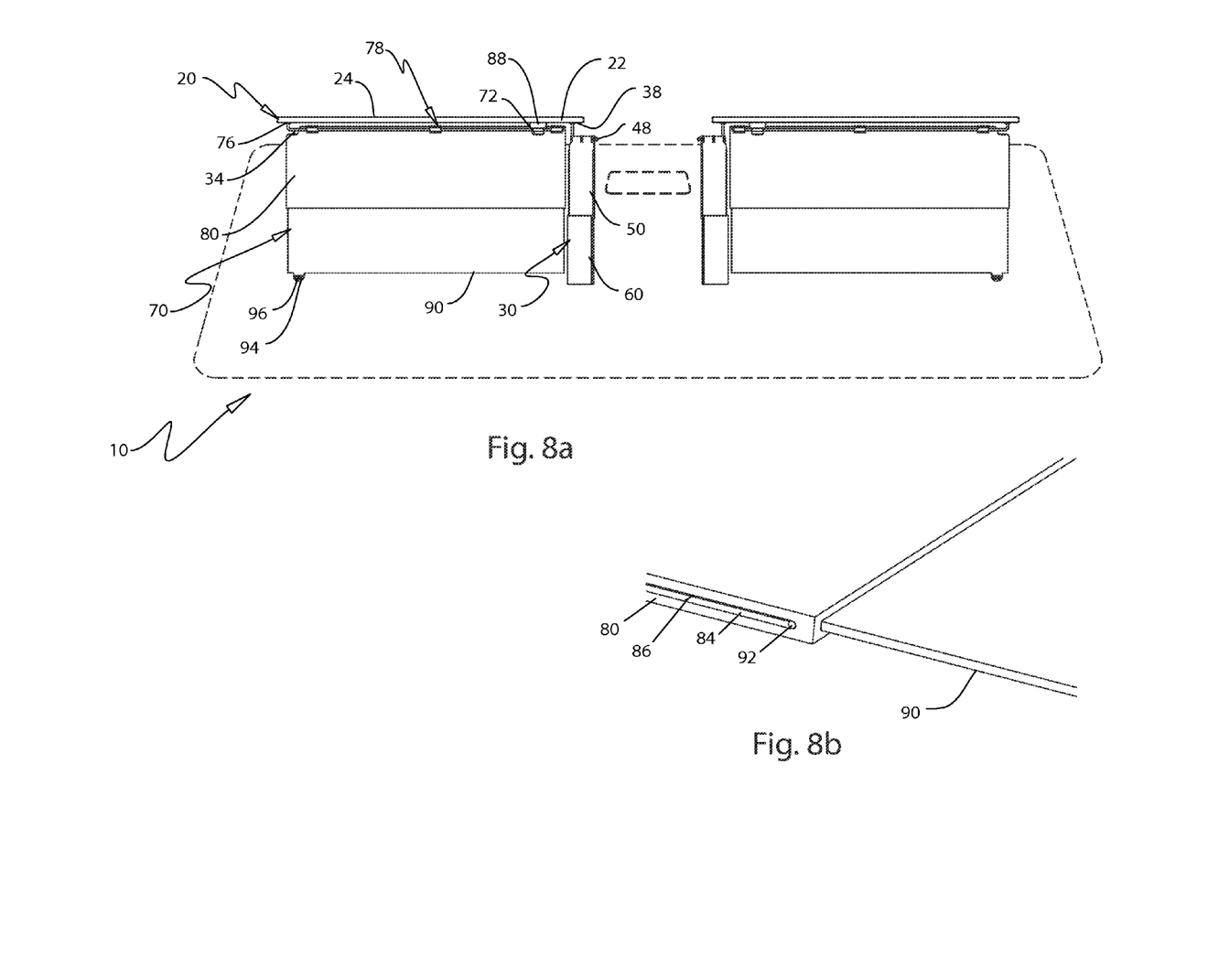
FIG. 8a is a view of the receiver panel assembly 70 deployed with an insert panel 90 extended, the first panel assembly 30 rotated toward mid-cabin, and with the third panel 60 extended.
FIG. 8b is an isolated view of a slide aperture 84 of a receiver panel 80 of the UV sun visor 10 shown in FIGS. 1 and 2.

Refer now to FIG. 8a for a view of the UV sun visor 10 depicting the receiver panel assembly 70 deployed with the insert panel 90 extended and the first panel assembly 30 rotated toward mid-cabin and to FIG. 8b for additional detail. The receiver panel 80 is configured to be a rectangular, planar polyhedron with an internal pocket to accommodate the rectangular insert panel 90. The internal pocket has an opening at a long edge of the receiver panel 80 opposite from the support cutouts, 72 in order to allow the insertion and extension of the insert panel 90. Disposed along some portion of each short side edge of the receiver panel 80 is a slide aperture 84. The receiver panel 80 is provided with slide pins 92 on each short side edge which are cylindrical projections engaged into the slide apertures 84 to retain the insert panel 90 within the receiver panel 80. It is envisioned that the slide pins 92 will be pressed into appropriately sized apertures (not shown) in the insert panel 90 to facilitate the assembly of the insert panel 90 within the receiver panel 80.

The slide apertures 84 in the receiver panel 80 are preferably provided with a plurality of detents 86 which is configured to be projections of material into the slide aperture 84 meant to interfere with the free travel of the slide pins 92 in the slide apertures 84 to permit a multi-positioning feature of the receiver assembly 70. Disposed along some part of that edge of the insert panel 90 which projects from the receiver panel 80 is a panel tab 94. The panel tab 94 is a rounded projection of the insert panel 90 meant to be used to slide the insert panel into and out from the receiver panel 80. The panel tab 94 is provided with a plurality of horizontal ridges which form a grip 96 to enhance a user's grasp of the insert panel 90.

Figure 9:
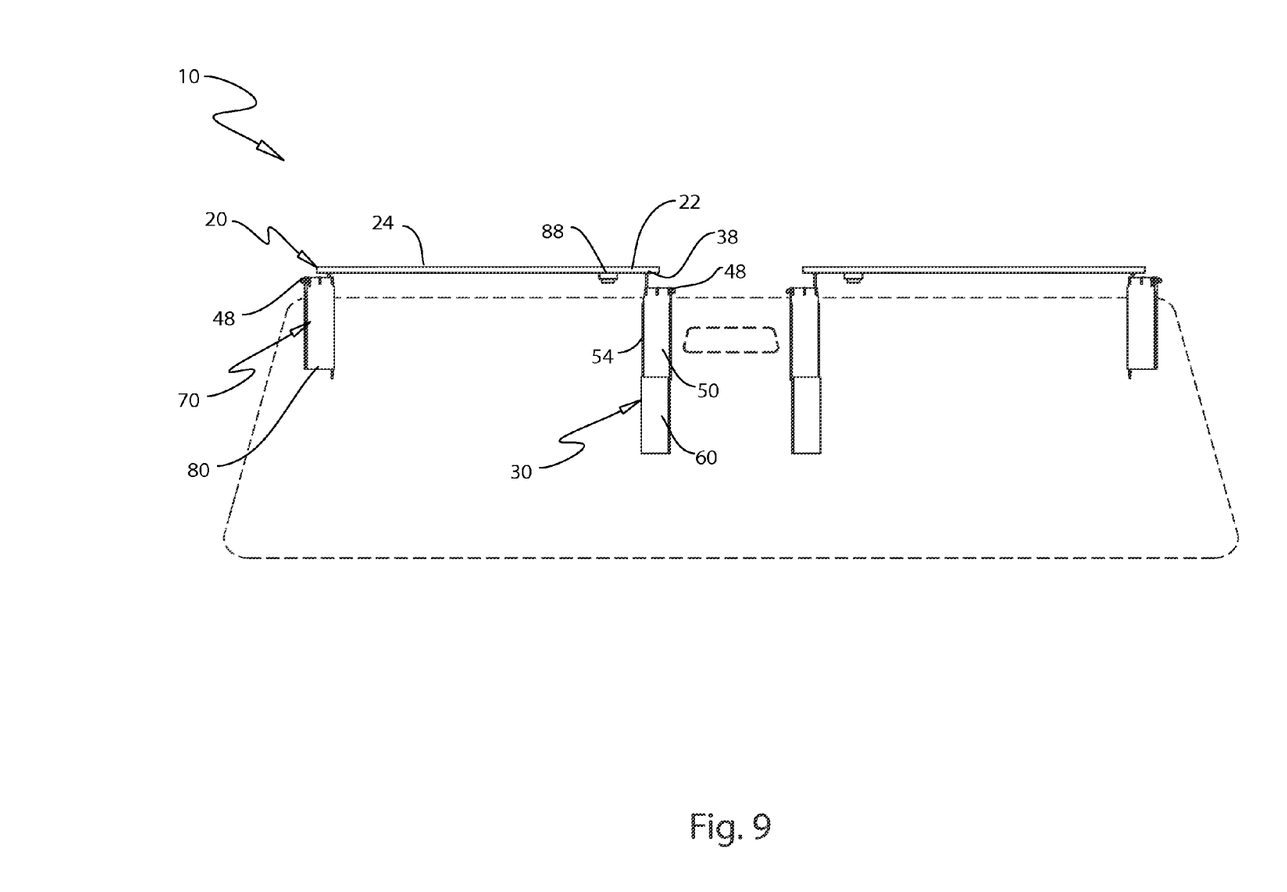
FIG. 9 is a depiction of the receiver panel assembly 70 of FIG. 7a rotated against a side window and the first panel assembly 30 of FIGS. 2a and 5 collapsed and stored.
Figure 10:
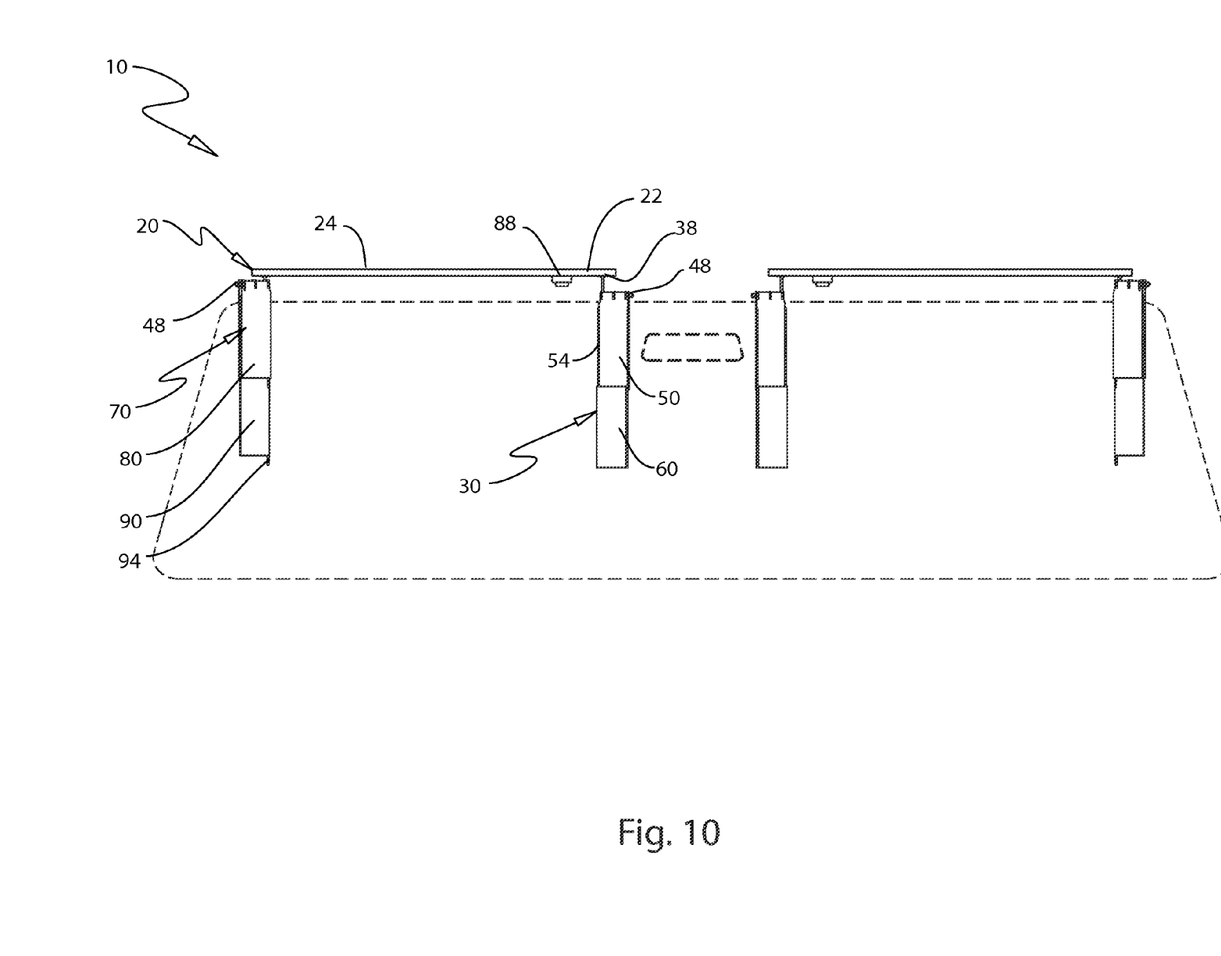
FIG. 10 is a depiction of the receiver panel assembly 70 of FIG. 7a rotated against a side window, the insert panel 90 of FIG. 8a extended, the first panel assembly 30 of FIGS. 2a and 5 rotated toward mid-cabin, and with the third panel 60 of FIG. 6 extended; and, FIG. 11 is a depiction of the receiver panel assembly 70 of FIG. 7a rotated against a side window and with the first panel assembly 30 of FIGS. 2a and 5 fully deployed across the windshield.
Figure 11:
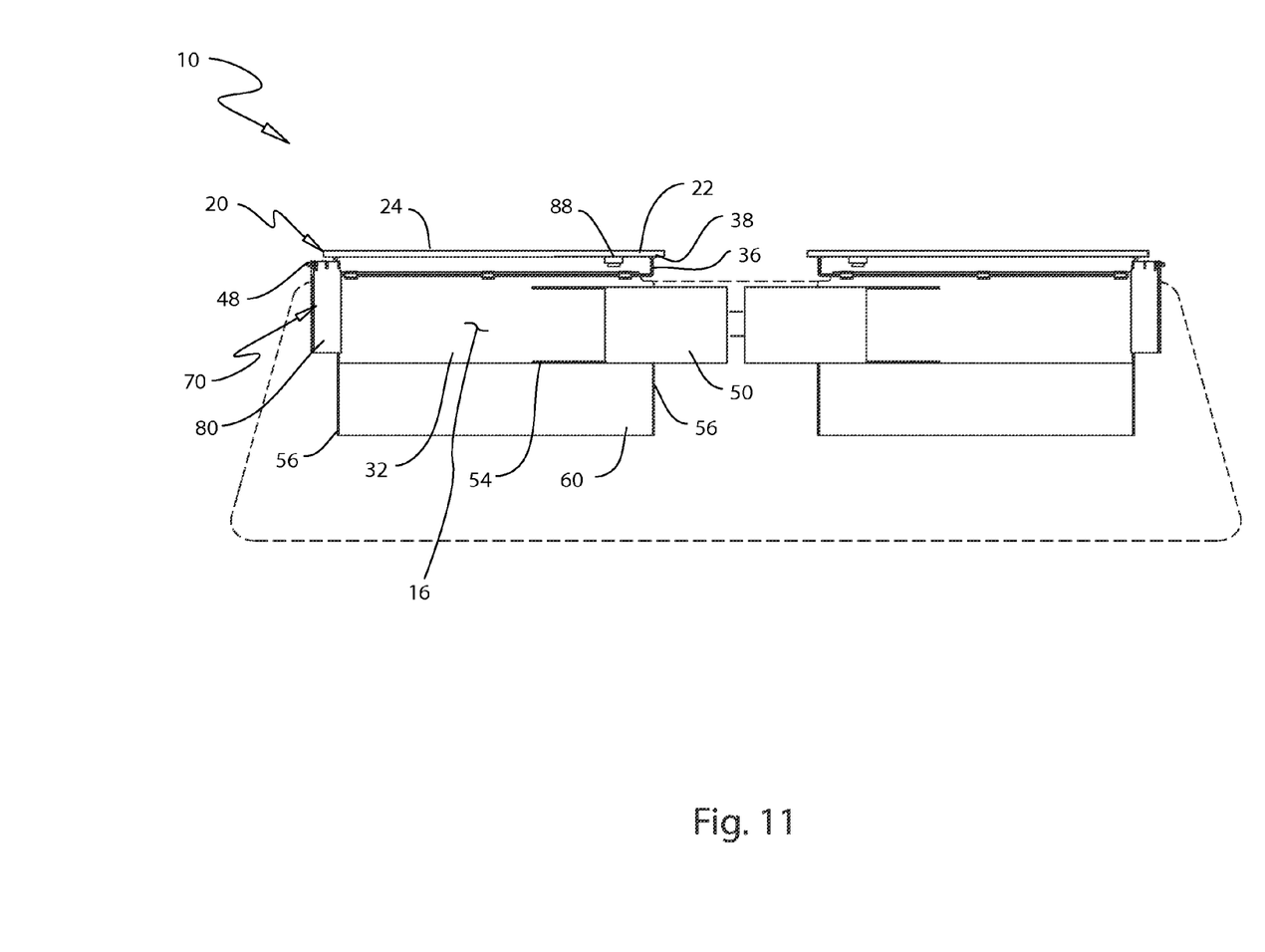

Refer now to FIGS. 9 through 11 for views of the UV sun visor 10 depicting the first panel assembly 30 and the receiver panel assembly 70 in partially and fully deployed configurations. The double visor assembly 20 can be arranged in more than twenty (20) different primary configurations. The number of combinations possible with only a partial deployment or rotation of the various panels 32, 50, 60, 80, and 90 is seemingly endless.

The preferred embodiment of the present invention can be used in a simple and straightforward manner with little or no training. After initial purchase or acquisition of the UV sun visor 10 it would be installed in a vehicle by a qualified technician and configured as indicated in FIG. 1. The method of installing and utilizing the UV sun visor 10 may be achieved by: acquiring a model of the UV sun visor 10 appropriate for installation into a user's vehicle; installing the UV sun visor 10 in a vehicle to replace the original equipment visor; rotating the first panel assembly 30 about the first support rod 36 into the user's field of vision as seen in FIG. 2 in order to be shielded from an intense or glaring light source coming from in front of the vehicle; further sliding the second panel 50 and the third panel 60 as required into the user's field of vision as seen in FIG. 5 to provide for increased shielding; rotating the first panel assembly 30 about the first support pivot 38 toward the middle of the passenger cabin, as seen in FIG. 6, to provide shielding from an intense or glaring light from that side of the vehicle; rotating the receiving panel assembly 70 about the second support rod 74 into the user's field of vision as seen in FIG. 7; sliding the insert panel 90 out of the receiver panel 80 as required; rotating the receiver panel assembly 70 about the second support pivot 76 toward the side window opposite from the middle of the passenger cabin and waiting for the photo-chromic material to respond to ultraviolet light waves. The first panel assembly 30 may be rotated about the first support pivot 38 back to a position in front of the user's field of vision if necessary after rotating the receiver panel 70 toward the side as seen in FIG. 11. It is understood that the operational steps may be performed in an alternative order, or as necessary, and any such operational description of use should not be considered as a limiting factor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A UV sun visor, comprising:
    a support frame configured to be attached to an interior surface of a roof of a vehicle;
    a first support rod pivotally affixed to said support frame;
    a second support rod pivotally affixed to said support frame; and,
    a double visor assembly having a first panel assembly with a first panel that is rotatably attached to said first support rod, a second panel attached to said first panel such that said second panel can slide along a length of said first panel, and a third panel attached to said first panel such that said third panel can slide along a width of said first panel; said double visor assembly further including a receiver panel assembly having a receiver panel rotatably attached to said second support rod and a panel insert that is attached to said receiver panel such that said insert panel can slide downward;
    wherein said first panel and said receiver panel are made from flexible polymer having a low glass transition temperature and are treated with an anti-reflective material; and
    wherein said first panel, said second panel, said third panel, said receiver panel and said insert panel pass some light.

2. The UV sun visor of claim 1, wherein said support frame has a quadrilateral cross-section.

3. The UV sun visor of claim 1, wherein said support frame further comprises a headliner face along an upper planar surface and a mounting face along a lower planar surface.

4. The UV sun visor of claim 3, wherein said headliner face is configured to be affixed to the interior surface of a vehicle roof.

5. The UV sun visor of claim 1, further including a first support pivot for pivotally affixing said first support rod to said support frame.

6. The UV sun visor of claim 5, further including a second support pivot for pivotally affixing said second support rod to said support frame.

7. The UV sun visor of claim 5, wherein said first support rod is "L" shaped.

8. The UV sun visor of claim 7, wherein said first support pivot retains a shorter leg of said first support rod.

9. The UV sun visor of claim 1, wherein said third panel and said second panel are made from flexible polymer having a low glass transition temperature and are treated with an anti-reflective material.

10. The UV sun visor of claim 9, wherein said first panel includes suspended photo-chromic particles.

11. The UV sun visor of claim 1, wherein said first panel includes a clearance cutout.

12. The UV sun visor of claim 1, wherein said first panel assembly further includes a slide guide for attaching said third panel to said first panel.

13. The UV sun visor of claim 12, wherein said slide guide includes a rail stop.

14. The UV sun visor of claim 1, wherein said insert panel is slidably deployable from a stored position within said receiver panel.

15. The UV sun visor of claim 14, wherein said receiver panel includes a clearance cutout.

16. The UV sun visor of claim 1, further comprising a pivot clip configured to retain said second support rod in a fixed position relative to said support frame.

* * * * *